US006855409B1

(12) United States Patent
Urushizaki et al.

(10) Patent No.: US 6,855,409 B1
(45) Date of Patent: Feb. 15, 2005

(54) METHOD FOR CONNECTING INSULATOR COATED WIRE

(75) Inventors: Mamoru Urushizaki, Chiryu (JP); Katsumi Nakazawa, Kariya (JP); Masato Ichikawa, Kariya (JP); Masami Kojima, Chiryu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 09/571,663

(22) Filed: May 15, 2000

Related U.S. Application Data

(62) Division of application No. 08/975,925, filed on Nov. 21, 1997, now abandoned.

(30) Foreign Application Priority Data

Nov. 22, 1996 (JP) .......................... 8-327648
Oct. 8, 1997 (JP) .......................... 9-293469

(51) Int. Cl.[7] .................. B32B 15/00; B32B 15/04; B32B 15/08; H01R 4/10; H01R 4/18

(52) U.S. Cl. .................. 428/309.9; 428/595; 428/600; 428/58; 428/121; 428/310.5; 428/397; 428/457; 428/458; 439/877

(58) Field of Search .................. 428/573, 574, 428/576, 577, 586, 594, 595, 600, 606, 607, 58, 121, 212, 223, 309.9, 310.5, 314.8, 314.2, 375, 397, 400, 457, 458; 219/56, 78.01, 85.16, 85.18, 86.1, 91.21, 119, 117.1, 118, 78.16; 439/877; 174/110 R, 126.2; 156/273.9

(56) References Cited

U.S. PATENT DOCUMENTS

| | | | |
|---|---|---|---|
| 3,519,778 A | 7/1970 | Gibson, Jr. | 219/58 |
| 3,523,173 A | 8/1970 | Lull | 219/91 |
| 4,034,152 A | 7/1977 | Warner | 174/94 R |

(List continued on next page.)

FOREIGN PATENT DOCUMENTS

| | | |
|---|---|---|
| JP | 52-59878 | 5/1977 |
| JP | 55-78477 | 6/1980 |
| JP | 57-55178 | 3/1982 |
| JP | 57-194514 | 11/1982 |
| JP | 56-133110 | 8/1983 |
| JP | 57-137812 | 3/1984 |
| JP | 62-272488 | 11/1987 |
| JP | 63-84782 | 4/1988 |
| JP | 62-38168 | 9/1988 |
| JP | 63-237368 | 10/1988 |
| JP | 2-156606 | 6/1990 |
| JP | 3-112113 | 5/1991 |
| JP | 5-38583 | 2/1993 |
| JP | 5-114450 | 5/1993 |
| JP | 6-36851 | 2/1994 |

OTHER PUBLICATIONS

Office Action dated Mar. 11, 2 003 in corresponding Japanese Application No. 8–327648 with translation.

*Primary Examiner*—Michael La Ville
(74) *Attorney, Agent, or Firm*—Harness, Dickey & Pierce, PLC

(57) ABSTRACT

There is provided a method for connecting an insulator coated wire with a conductive member while keeping the electrical resistance low and enough joint strength at the joint section therebetween without removing the coating film of the insulator coated wire beforehand. The conductive member has upper and lower pieces which pinch the insulator coated wire, and a gap between the upper and lower pieces varies at different locations. The wire and the conductive member have a good electrical connection at a region of the joint section where the gap between the upper and lower pieces is narrow. In addition, the connection strength of the wire and the conductive member can be enhanced at a region of the joint section where the gap between the upper and lower pieces is wide.

7 Claims, 7 Drawing Sheets

U.S. PATENT DOCUMENTS 4,538,045 A * 8/1985 Slavin et al. ............ 219/91.21
4,571,019 A * 2/1986 Arai ....................... 339/276 R
4,873,411 A 10/1989 Saen et al. .................... 219/93
4,878,969 A * 11/1989 Janisch ........................ 156/49
4,902,867 A * 2/1990 Haramaki et al. ....... 219/85.18
4,951,389 A * 8/1990 Kaley et al. .................. 29/863
5,264,674 A * 11/1993 Mangan et al. .......... 219/56.22
5,587,091 A * 12/1996 Kawagee et al. ........... 219/110
6,011,233 A * 1/2000 Hwang et al. ........... 219/91.21
6,099,364 A * 8/2000 Shinchi ...................... 439/874
6,125,533 A * 10/2000 Warner et al. ................ 29/868

* cited by examiner

FIG. 5A
FIG. 5B
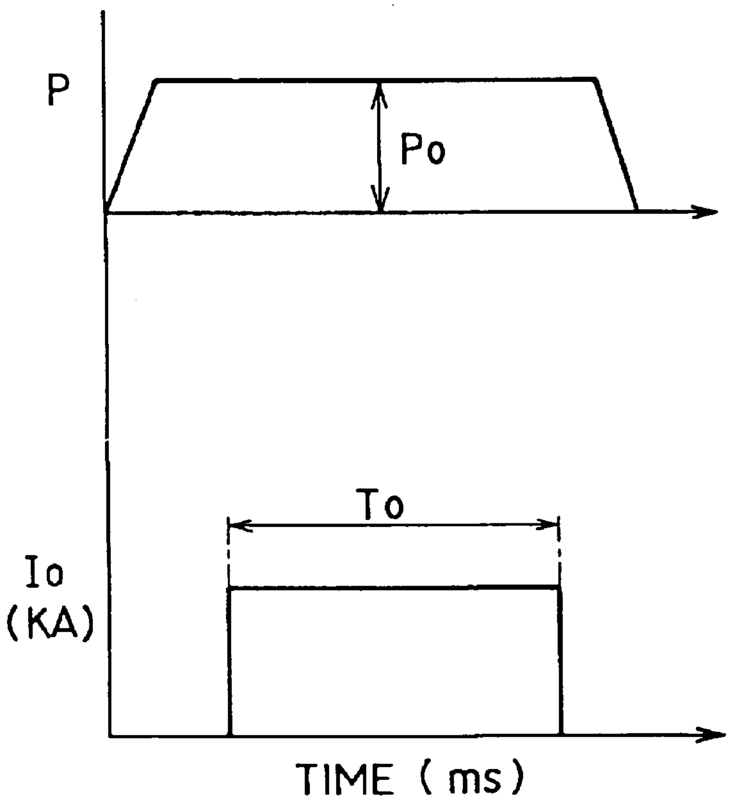
FIG. 6
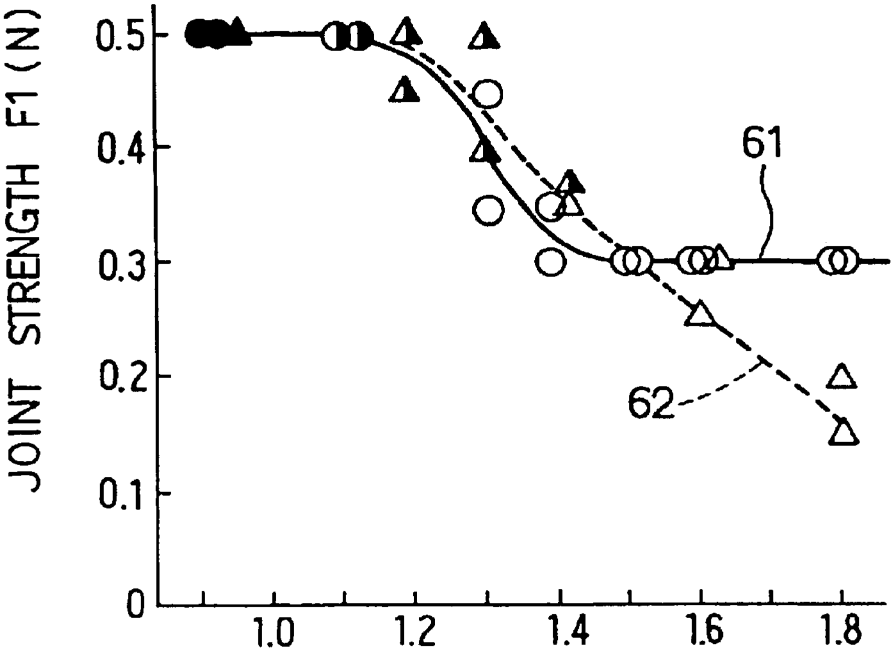

METHOD FOR CONNECTING INSULATOR COATED WIRE

CROSS REFERENCE TO RELATED APPLICATIONS

This application is a division of Application Ser. No. 08/975,925 filed Nov. 21, 1997, now abandoned and is based upon and claims the benefit of priority of prior Japanese Patent Applications No. H. 8-327648 filed on Nov. 22, 1996, and No. H. 9-293469 filed on Oct. 8, 1997, the contents of all three of which are incorporated hereinto by reference.

BACKGROUND OF THE INVENTION

1. Field of the Invention

The present invention relates to a method for connecting an insulator coated wire with a conductive member by means of resistance welding.

2. Description of Related Art

FIGS. 14 and 15 shows methods for connecting an insulator coated wire with a conductive member. In the method shown in FIG. 15, an insulator coating film 915 is removed from a joint section 911 of the wire 91 by a mechanical or chemical method and then solder 93 is applied to the joint section 911 to connect with the conductive member 92. In the method shown in FIG. 14, the joint section 911 is connected with the conductive member 92 by means of resistance welding after removing the insulator coating film 915. There are also shown welding electrodes 951 and 952 and a power transformer 955 in FIG. 14. Jet 930 of the solder is schematically shown in FIG. 15.

For the case when the heat resistance of the insulator coating film 915 is low (i.e. when the coating film is made of polyurethane, polyester and the like), there has been known a method of melting the insulator coating film 915 by the solder 93, without removing the insulator coating film 915, and of soldering the insulator coated wire 91 with the conductive member 92 as shown in FIG. 16.

Similarly to that, there has been known a method of melting the insulator coating film 915 by heat, without removing it, and of directly resistance-welding the insulator coated wire 91 with the conductive member 92. In this method, for example, the insulator coated wire 91 is pinched between the conductive member 920 which is bent in the shape of a letter U. The insulator coated wire 91 and the conductive member 920 are pressed with force F applied by electrodes 951 and 952 as shown in FIGS. 17A and 17B. In this state, a current I is fed between both electrodes 951 and 952. Then, the insulator coating film 915 melts by the Joule heat generated by the current I, thus resistance-welding the insulator coated wire 91 and the conductive member 920. Such a method of jointing the insulator coated wire and the conductive member without removing the insulator coating film 915 of the insulator coated wire 91 is very efficient.

However, there has been a problem in the method of melting the insulator coating film by the heat of the solder that the insulator coating film may not melt fully when the melting point of the insulator coating film is high. As a result, the conduction resistance of the joint section between the insulator coated wire and the conductive member may become large.

According to the resistance welding method of melting the insulator coating film with heat generated by the current as described above, there has been no problem in melting the insulator coating film because the temperature becomes high. However, there has been another problem that when the diameter of the insulator coated wire is small, it is difficult to attain both objects of keeping the conduction resistance fully low and of obtaining enough joint strength at the joint section of the insulator coated wire with the conductive member. That is, the joint section must be heated up fully in order to lower the conduction resistance of the joint section by removing tidily the coating film, i.e., an insulator. However, when the insulator coated wire is pressed under the high temperature, it deforms significantly and its strength is weakened. That is, a wire whose sectional profile has been circular (diameter: D0) before welding is deformed into the oval shape (minor axis: D2) in the typical case as shown in FIG. 12C for example. As a result, the strength of the wire (tensile strength) becomes weak. When such a wire is heated to a high temperature, it gets out of shape and its shape varies, not actually assuming the fine oval shape as shown in FIG. 12C. In addition to that, its sectional area is reduced as it is extended in the longitudinal direction of the wire. As a result, the tensile strength of the joint section varies, thereby decreasing the production yield.

When the quantity of heat applied to the insulator coated wire is suppressed to avoid the above-mentioned problems, the deformation of the wire is reduced and the variation of the shape is reduced as shown in FIG. 12B for example. Therefore, enough strength may be obtained in terms of the tensile strength of the wire. However, there has been the problem that the coating film, i.e., the insulator, is not removed completely and remains at the joint section, thus increasing the electrical resistance of the joint section.

When electric power is fed to the U-shaped conductive member 920, the current I flows concentratedly through an R section 922 and heat is generated locally at this part as shown in FIGS. 17A and 17B. The temperature of the insulator coating film rises, thus melting the film, due to the heat transmitted from the R section 922. Further, the coating film melted is excreted by the pressure applied through the electrodes 951 and 952. In such a process, the higher the heat resistant temperature of the insulator coating film due to the diameter of the insulator coated wire 91 being thick for example, the more the quantity of heat required in order to melt it. It is then necessary to feed more current to the conductive member 920 in order to maintain such a quantity of heat. Due to that, it becomes necessary to increase the sectional area of the conductive member 920 so that it can withstand such a large current. Empirically, the conductive member is required to have a thickness which is equal to or larger than the diameter of the insulator coated wire 1 to be connected and a width more than twice of the diameter thereof.

Accordingly, when a conductive member having no such sectional area corresponding to the insulator coated wire to be connected is used, the current necessary for the connection cannot be fed through the conductive member, and therefore, the insulator coating film cannot be removed completely. When an excessive amount of large current is fed through the conductive member on the other hand, the R section 922 of the conductive member 920 may generate heat excessively. As a result, the temperature of the conductive member exceeds its melting temperature with the result that it melts and deforms or it is softened so that buckling thereof occurs.

Therefore, it has been essential to select the sectional area (thickness and width of the plate) of the conductive member in correspondence to the diameter of the insulator coated wire and it has been very difficult to miniaturize and to unify the conductive member in the prior art connecting method for the insulator coated wire using the conductive member 920 having a U-shaped section.

Accordingly, it is a primary object of the present invention to provide a structure and method for connecting an insulator coated wire with a conductive member which allows retaining the electrical resistance low and obtaining enough joint strength at a joint section therebetween when the insulator coated wire is jointed with the conductive member without removing the coating film of the insulator coated wire beforehand.

A secondary object of the present invention is to provide a structure and method for connecting an insulator coated wire with a conductive member which allows the conductive member to be miniaturized more than conventional ones.

SUMMARY OF THE INVENTION

In order to achieve the above-mentioned primary object of the invention, a region of an insulator coated wire where a pressed deformation is large and a region of the wire where a pressed deformation is small are provided at the section where the wire is connected with a conductive member. As a result, the quantity of heat can be increased at the region where the wire pressed deformation is large during the operation of joining the wire to the conductive member. Therefore, an insulator coating film of the insulator coated wire may be fully removed from the joint section by the applied pressure. As a result, the conduction resistance of the joint section may be reduced. Although the insulator coating film may not be fully removed and the conduction resistance between the wire and the conductive member may become large at the region where the wire pressed deformation is small, the shape of the wire will be retained and enough tensile strength will be maintained.

The region where the pressed deformation is small is located on a side from which the insulator coated wire is taken out of the conductive member, i.e., a side on which the wire through which a current and signals flow extends from the conductive member, at the section where the insulator coated wire is connected with the conductive member. Even when a tensile force acts between the conductive member and the insulator coated wire, the insulator coated wire can maintain enough strength by the region where the joint strength is strong. That is, the tensile strength of the insulator coated wire and the conductive member when they are pulled in the parallel direction F1 and in the vertical direction F2 as shown in FIG. 4 becomes large.

It is noted that although the joint section of the conductive member and the insulator coated wire may be one (on one face) as shown in FIG. 13, it is preferable to arrange such that the conductive member pinches and presses the insulator coated wire from the top and bottom and thereby jointing with the wire at two places (both top and bottom faces). In this case, the joint strength increases, the conduction resistance becomes low and it is easier to join them between both faces of the top and bottom faces of the conductive member.

When the insulator coated wire is pinched and pressed by the conductive member from the top and bottom, it is preferable to arrange the shape of the conductive member such that the gap between the upper and lower conductive members changes at different locations. Thereby, the region where the pressed deformation is large and the region where the pressed deformation is small may be created readily at the section where the insulator coated wire is connected to the conductive member. As a result, the electrical resistance can be kept low and a fully strong joint strength may be obtained at the joint section of the wire and the conductive member. The upper and lower pieces of the conductive member may be formed in a single body. In such a case, no dislocation occurs between the upper and lower pieces of the conductive member and they may be handled readily during the assembly work.

The conductive member whose vertical gap changes as the location changes may be obtained by narrowing the gap on a side on which the upper and lower pieces of the conductive member having the U-shaped section is apart more than the gap on a side on which the upper and lower pieces are linked. The conductive member having such a shape may be relatively readily manufactured.

The conductive member whose vertical gap changes as the location changes may be obtained by changing the thickness of the upper and lower pieces and by widening/narrowing the gap between the upper and lower pieces as shown in FIGS. 7 and 8. Such a member may be readily manufactured by press.

The conductive member whose vertical gap changes as the location changes may be composed of a first pinching section, having a narrow vertical gap, for pinching the insulator coated wire, a second pinching section, having a wide vertical gap, for pinching the insulator coated wire and a link section for linking the first and second pinching sections as shown in FIG. 9.

Wire anchoring sections for anchoring the insulator coated wire may be provided on both sides of the conductive member. The insulator coated wire may be disposed from the region where the vertical gap of the conductive member is wide to the region where the vertical gap is narrow by anchoring the insulator coated wire at the wire anchoring sections. Because the accuracy of the relative position of the insulator coated wire and the conductive member may be improved as a result, the desired structure of connection may be obtained easily by resistance-welding both in this state.

It is also possible to use a resistance welder in which the gap between electrodes changes stepwise or continuously in order to create the region where the pressed deformation is large and the region where the pressed deformation is small at the joint section of the insulator coated wire and the conductive member. The resistance welder resistance-welds the insulator coated wire with the conductive member by pressing the conductive member and the insulator coated wire between the electrodes and by supplying a current to the electrodes while pinching the insulator coated wire between the upper and lower pieces of the conductive members. It is noted that the conductive member and the insulator coated wire are set in the resistance welder so that the region where the pressed deformation is small is positioned on the side where the insulator coated wire is taken out of the conductive member. The gap between the upper and lower pieces of the conductive member changes in accordance to the gap between the electrodes when the conductive member and the insulator coated wire are pressed between the electrodes. Thereby, the region where the pressed deformation is large and the region where the pressed deformation is small are created at the section where the insulator coated wire is connected to the conductive member.

In order to achieve the above-mentioned secondary object, according to the inventive method for connecting an insulator coated wire having a coating film to a conductive member, the conductive member to which the insulator coated wire is to be connected is composed of upper and lower pieces for pinching the insulator coated wire therebetween. The upper and lower pieces are electrically connected to each other so as to form respective current paths at both sides of the insulator coated wire. Pressure is applied to the upper and lower pieces of the conductive member while pinching the insulator coated wire between the upper and lower pieces and the current is fed between the upper and lower pieces to cause the current paths at both sides of the insulator coated wire. Due to the feeding of the current, heat is generated at the current paths and the insulator coated wire and the conductive member are connected by the heat transmitted from the current paths on both side and the above-mentioned pressure.

When the current is fed through the conductive member, the current flowing between the upper and lower pieces of the conductive member passes through the current paths provided on both sides of the insulator coated wire. That is, the current path which has been only one in the prior art is doubled. Accordingly, the current permissible for the conductive member increases as the current paths increase. In other words, the conductive member allows large current to flow therein without the temperature thereof excessively rising.

Further, because the heat (Joule heat) caused by the current is generated at the two current paths located on both sides of the insulator coated wire, the heat transmission to the section where the insulator coated wire is pinched occurs from both sides of the wire simultaneously. Therefore, the heat transmission to the insulator coated wire may be achieved more efficiently than in the past.

Accordingly, the present invention allows the quantity of heat to be increased by feeding a large current which is greater than the past one to the conductive member and the heat transmission to be achieved efficiently. Therefore, even an insulator coated wire having a large diameter which could not be connected in the past can be connected stably and reliably with the conductive member which is small as compared to the past ones.

BRIEF DESCRIPTION OF DRAWINGS

These and other objects, features and characteristics of the present invention will be appreciated from a study of the following detailed description, the appended claims, and drawings, all of which form a part of this application. In the drawings:

FIGS. 5A and 5B are graphs showing the temporal transition of applied pressure and welding current in joining the conductive member with the insulator coated wire in the first embodiment;

FIG. 6 is a graph schematically showing the result of a strength test of the conductive member and the insulator coated wire after joining them implemented in the first embodiment;

DESCRIPTION OF PREFERRED EMBODIMENTS

[First Embodiment]

Figure 1:
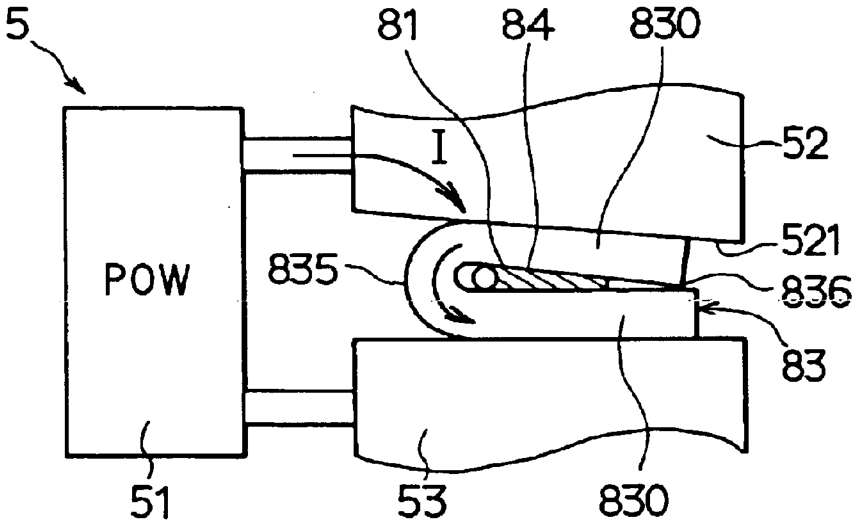
FIG. 1 is a front view schematically showing a resistance welding method of a first embodiment.
Figure 2:
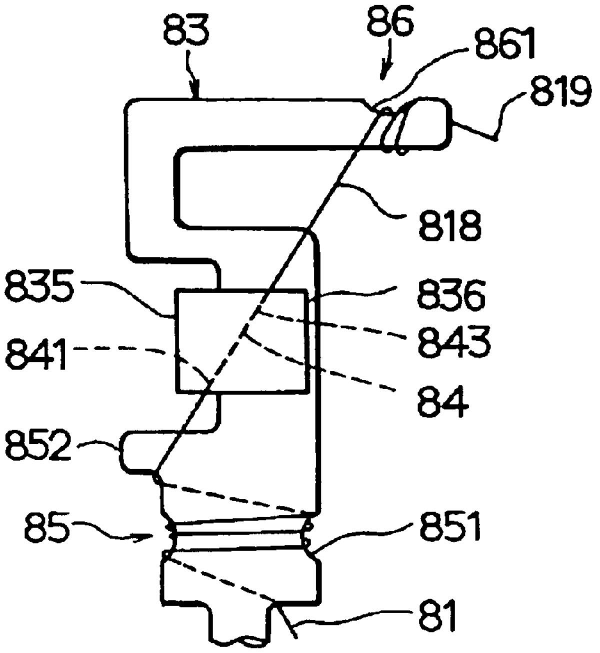
FIG. 2 is a plan view of a conductive member and an insulator coated wire shown in FIG. 1.
Figure 3:
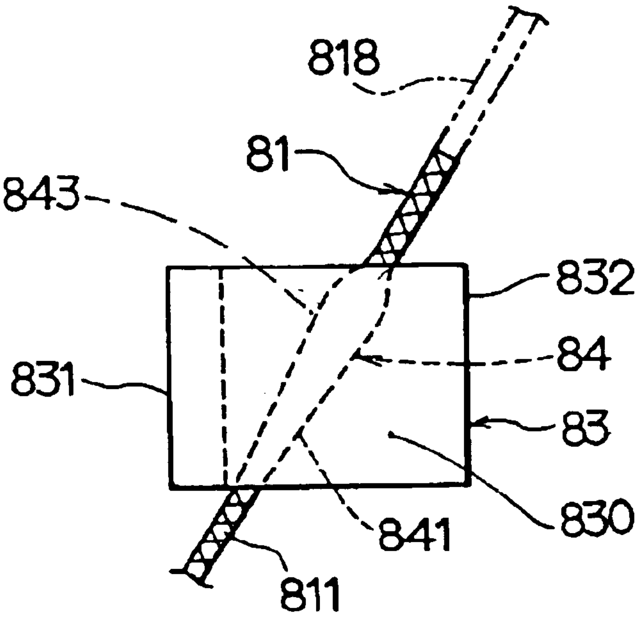
FIG. 3 is an enlarged view of the section where the conductive member is connected with the insulator coated wire shown in FIG. 2.
Figures 12A, 12B, 12C:
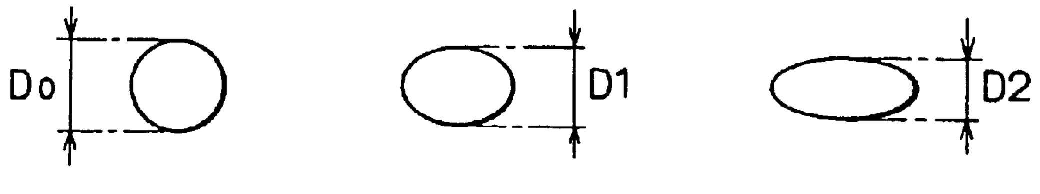
FIGS. 12A through 12C are diagrams showing sectional profiles of the insulator coated wire before and after the resistance welding.
Figure 15:
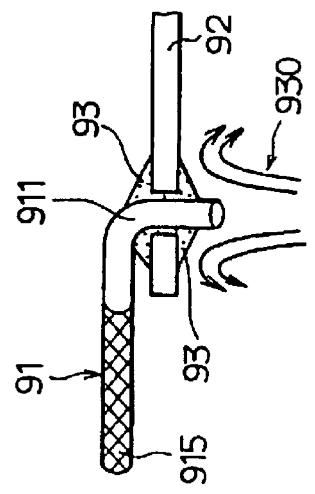
FIG. 15 PRIOR ART
FIG. 15 is a front view schematically showing a prior art welding method by means of soldering.
Figure 14:
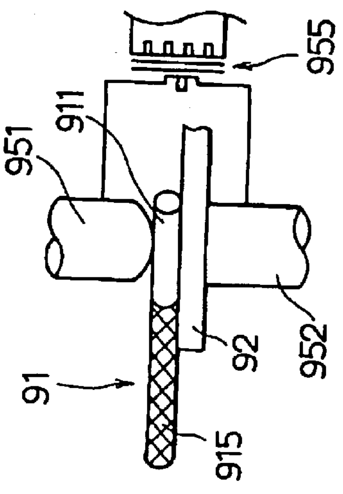
FIG. 14 PRIOR ART
FIG. 14 is a front view schematically showing a prior art resistance welding method.
Figure 13:
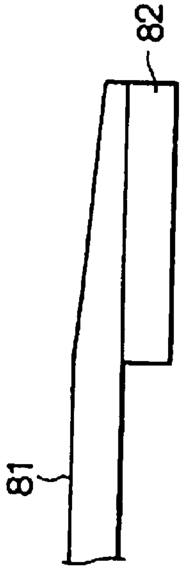
FIG. 13 is a view schematically showing one example in which a region where a pressed deformation of the insulator coated wire is large and a region where the pressed deformation is small are provided at the connection section of the insulator coated wire and the conductive member.
Figure 16:
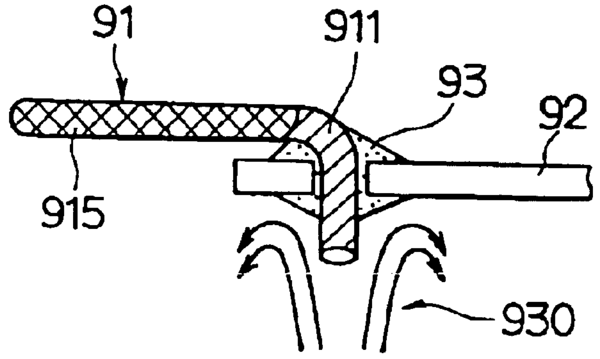
FIG. 16 PRIOR ART
FIG. 16 is a front view schematically showing another prior art welding method by means of soldering.

The present embodiment relates to a method for connecting an insulator coated wire 81 having an insulator coating film 811 (FIG. 3) with a conductive member 83 by means of resistance welding while pressing them as shown in FIGS. 1 through 3. The insulator coated wire 81 is pressed and connected with the conductive member 83 so that a first portion or region (e.g. the region having a cross-section profile shown in FIG. 12C) where a pressed deformation is large (the distal segment) and a second portion or region (e.g. the region having a cross-section profile shown in FIG. 12B) where the pressed deformation is small (the proximal segment) are formed at its connecting section 84. As shown in FIGS. 3 and 12, connecting section 84 has a width in cross-section that tapers from a narrow cross-section at a first point or side 841 adjacent to the second portion to a wide cross-section at a second point or side 843 distal from the second portion. At this time, the second portion or region where the pressed deformation of the wire is small is positioned on the side where the insulator coated wire 81 extends out of the conductive member 83.

As shown in FIG. 1, the conductive member 83 has a U-shaped section so as to press and pinch the insulator coated wire 81 from the top and bottom. The vertical gap between connecting sections 830 (first and second clamping elements) of the conductive member 83 changes as the location changes. As shown in FIGS. 1 through 3, the resistance welding method of the present embodiment comprises a first step of disposing the insulator coated wire 81 in the conductive member 83 so that the connecting section 84 of the wire takeout side 841 (the proximal segment) where the wire 81 is taken out of the conductive member 83 is positioned at the region where the connecting sections 830 of the conductive member 83 has a wide gap and a second step of pressing the insulator coated wire 81 with the conductive member 83 and resistance-welding them.

As shown in FIG. 2, wire anchoring sections 85 and 86 for anchoring the insulator coated wire 81 are extended from the conductive member 83. The insulator coated wire 81 may be disposed diagonally across the first and second clamping members of conductive member 83 from the region where the gap between the connecting sections 830 is wide to the region where the gap therebetween is small in the conductive member 83 by anchoring the insulator coated wire 81 around the wire anchoring sections 85 and 86 in the first step. The wire anchoring section 86 positioned on a side of the end 819 of the insulator coated wire 81 is removed together with the anchored wire 818 to define a terminal end of the wire after the second step has been performed.

As shown in FIG. 1, a resistance welder 5 of the present embodiment comprises a power source 51 and electrodes 52 and 53. While the lower electrode 53 is a normal flat electrode, the upper electrode 52 has a bottom 521 uniformly slanted. The conductive member 83 has the U-shaped sectional profile and pinches the insulator coated wire 81 between connecting sections 830 which extend in parallel. At this time, the insulator coated wire 81 is disposed obliquely or diagonally from the side of a R section 835 (connecting section) to the side of an opening section 836 of the U-shaped conductive member 83. At this time, the wire takeout side 841 of the insulator coated wire 81 is positioned on the side of the R section 835 as shown in FIG. 2. Then, the conductive member is set between the electrodes 52 and 53 of the resistance welder 5 so that the opening section 836 of the U-shaped conductive member 83 pinching the insulator coated wire 81 comes to the side where the gap between the electrodes 52 and 53 is narrow as shown in FIG. 1. The resistance welding is then carried out.

The method for connecting the insulator coated wire will be explained below in detail. At first, the opening section 836 is opened forming an angle of 60 to 90. In this state, the insulator coated wire 81 is wound around a furrow 851 of the wire anchoring section 85 by one or several times as shown in FIG. 2 to absorb thermal stress caused by the change of temperature by this waste wire winding. Then, after winding the wire around the furrow 851, the insulator coated wire 81 is extended to a furrow 861 of the second wire anchoring section 86 starting from a positioning guide section 852. Then, it is wound around the furrow 861 by several times to fix it.

Next, the gap of the opening section 836 of the U-shaped conductive member 83 is narrowed to a degree not deforming the conductive member 83 to tentatively fix the insulator coated wire 81 with the conductive member 83. One having the same inclination as the electrodes 52 and 53 is used as a caulking jig for tentatively fixing them. As a result of the tentative fixation, the conductive member 83 and the insulator coated wire 81 can maintain the stable positional relationship.

Next, the insulator coated wire 81 is pressed through the conductive member 83 by the electrodes 52 and 53 of the resistance welder 5 as shown in FIG. 1. Further, the power source 51 is turned on to feed a current I between the electrodes 52 and 53 to heat the connecting section 830 of the conductive member 83 and, in turn, the connecting section 84 of the insulator coated wire 81 by Joule heat. As a result, the coating film 811 of the insulator coated wire 81 melts and the melted coating film 811 is removed by the pressure applied between the electrodes 52 and 53. Because the pressure is strong at the edge 843 (the distal segment) of the insulator coated wire 81 in particular, the coating film 811 is effectively removed. As a result, the insulator coated wire 81 and the conductive member 83 conduct electrically well. Because the pressure is weak at the wire takeout side 841 of the insulator coated wire 81 in contrary, the insulator coated wire 81 is deformed less and the tensile strength of the insulator coated wire 81 is maintained.

Figure 4:
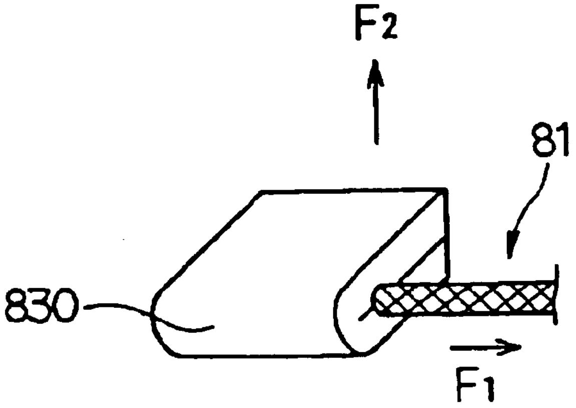
FIG. 4 is a perspective view of the conductive member and the insulator coated wire after joining them according to the first embodiment.

As described above, the section 843 where the electrical resistance is low and the section 841 where the tensile strength is strong are created in the connecting section 84 of the insulator coated wire 81 according to the resistance welding method of the present embodiment. Because the section 841 where the tensile strength is strong is located at the wire takeout side of the insulator coated wire 81, the joint strength of the conductive member 83 and the insulator coated wire 81 increases. That is, the tensile strength increases in a case where external forces F1 and F2 are applied as shown in FIG. 4. After completing the resistance welding, the wire anchoring section 86 on a side of the wire end 819 and the wire 818, which are unnecessary part, shown in FIG. 3 are cut.

Figure 17A:
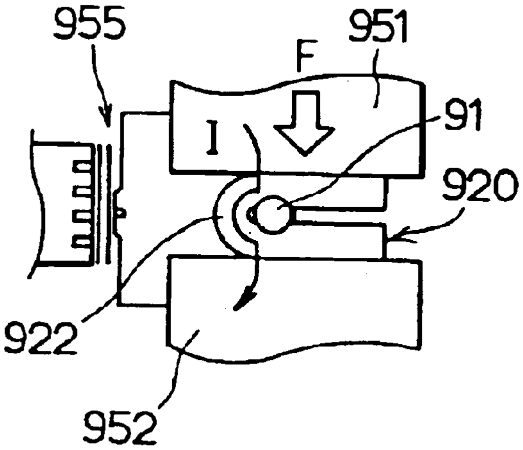
FIG. 17A PRIOR ART
FIGS. 17A and 17B are front views schematically showing another prior art resistance welding method.
Figure 17B:
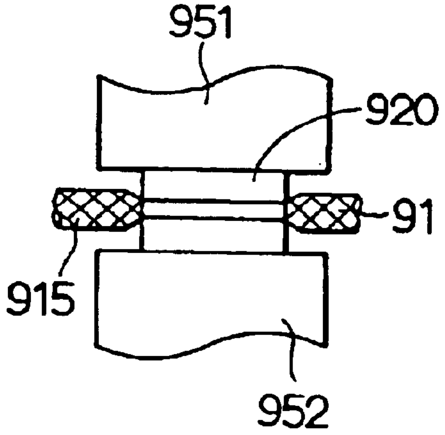
FIG. 17B PRIOR ART

FIG. 6 is a graph showing the joint strength of the insulator coated wire and the conductive member resistance-welded by the resistance welding method of the present embodiment and by the prior art method shown in FIGS. 17A and 17B. The insulator coated wire 81 used in the experiment was what a polyamideimide type heat resistant coating film is coated on a copper wire of 45 micron in diameter (manufactured by Sumitomo Electric Industries, Ltd.). The conductive member 83 was a plate having a thickness of 0.3 mm in which Sn was plated on C2600 (brass).

Then, the resistance welding was carried out by applying a force Po of 85 N between the electrodes 52 and 53 of the resistance welder 5 (area: about 12 $mm^2$) as shown in FIG. 5A and by feeding a current Io of 900 to 1800 A as shown by the horizontal axis of FIG. 6 during time To of 100 ms. as shown in FIG. 5B.

FIG. 6 shows the joint strength F1 (FIG. 4) and the quality of the conduction of the joint section (state of the peeled coating film) as its result. In the graph, marks and a curve 61 represent the result obtained by the resistance welding method according to the present embodiment and marks and a curve 62 represent the result obtained by the prior art resistance welding method. Those marks and which are smeared in black represent what the conductivity of the joint section is not good. Those marks and which are smeared in black only by a half represent what the conductivity of the joint section is not enough and those marks and which are white represent what the conductivity of the joint section is good.

As it is apparent from the graph, the joint strength F1 drops considerably when the conductivity of the joint section is kept well in the prior art method (it drops below 50% of the original strength of the insulator coated wire 81). In contrary to that, the conduction resistance of the joint section becomes good (small) with less energization current in the present embodiment as compared to the prior art method. Further, the joint sections in which the conductivity is good and the joint strength is more than 50% of the insulator coated wire 81 can be obtained within a wide range of the energization current.

As described above, the present embodiment allows the electrical resistance (conduction resistance) to be kept low and enough joint strength to be obtained at the connection section 84 of the insulator coated wire 81 even when the insulator coated wire 81 is jointed to the conductive member 83 without removing the coating film of the insulator coated wire 81 beforehand.

[Second Embodiment]

Figure 7:
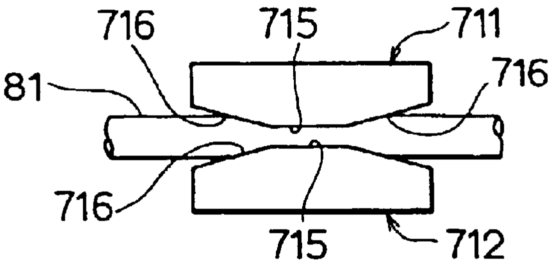
FIG. 7 is a front view schematically showing a resistance welding method of a second embodiment.

According to the present embodiment as shown in FIG. 7, conductive members 711 and 712 are made from upper and lower pieces for pinching the insulator coated wire 81. The gap between the upper piece 711 and the lower piece 712 is widened/narrowed as the location changes by changing the thickness of each of the upper piece 711 and the lower piece 712. As a result, a good electrical conductivity can be obtained between the insulator coated wire 81 and the conductive members 711 and 712 at the region 715 where the gap is narrow and the joint strength can be maintained well at the region 716 where the gap is wide.

The other elements are the same as in the first embodiment described above.

[Third Embodiment]

Figure 8:
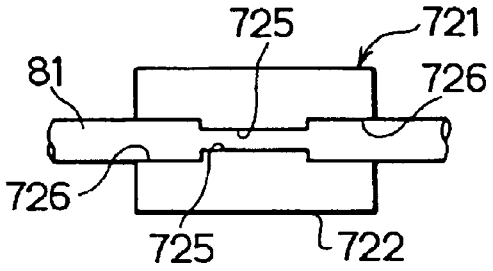
FIG. 8 is a front view schematically showing a resistance welding method of a third embodiment.

According to the present embodiment as shown in FIG. 8, the shape of the conductive members 721 and 722 is modified from the conductive members 711 and 712 of the second embodiment. As a result, good conductivity can be obtained at the region 725 where the gap is narrow and the joint strength can be maintained well at the region 726 where the gap is wide.

The other elements are the same as in the first embodiment described above.

[Fourth Embodiment]

Figure 9A:
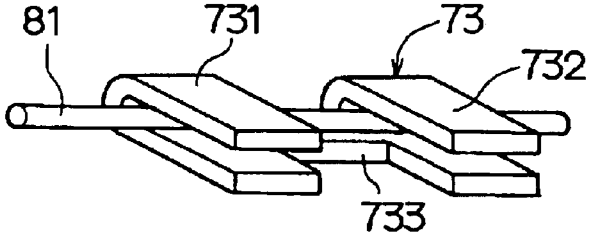
FIG. 9A is a perspective view schematically showing a resistance welding method of a fourth embodiment.
Figure 9B:
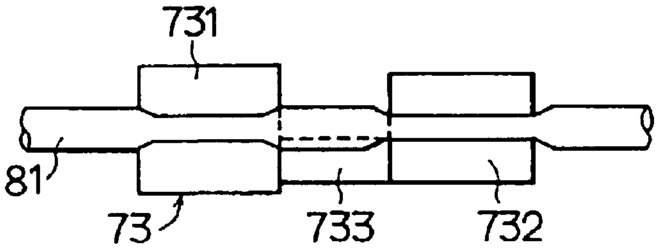
FIG. 9B is a front view of FIG. 9A.

According to the present embodiment shown in FIGS. 9A and 9B, a conductive member 73 comprises a first pinching section 732 having a narrow vertical gap and a second pinching section 731 having a wide vertical gap and a linking section 733 for linking the both pinching sections 731 and 732. As a result, good conductivity can be obtained at the pinching section 732 where the gap is narrow and the joint strength can be maintained well by the pinching section 731 where the gap is wide.

The other elements are the same as in the first embodiment described above.

[Fifth Embodiment]

Figure 10:
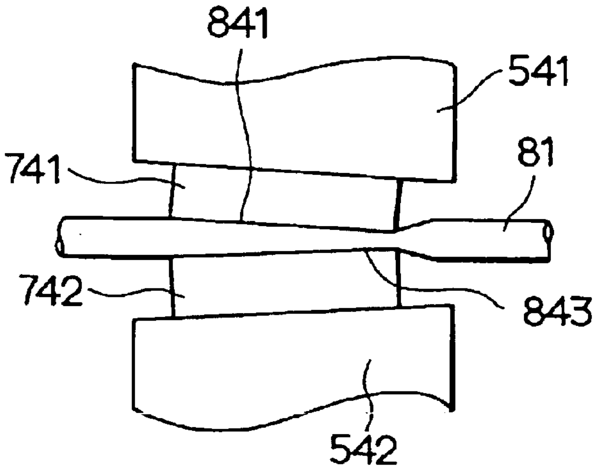
FIG. 10 is a front view schematically showing a resistance welding method of a fifth embodiment.

The FIG. 10 embodiment is arranged such that conductive members 741 and 742 are made from an upper piece 741 and a lower piece 742 having a uniform thickness and the gap between electrodes 541 and 542 of the resistance welder 5 changes continuously.

The insulator coated wire 81 is pinched between the conductive members 741 and 742 while the conductive members 741 and 742 and the insulator coated wire 81 is disposed between the electrodes 541 and 542 so that the gap between the electrodes 541 and 542 changes (decreases) from the wire takeout side 841 to the edge side 843 of the insulator coated wire 81. Then, in this state, resistance welding is carried out while pressing the conductive members 741 and 742 as well as the insulator coated wire 81 between the electrodes 541 and 542.

The other elements are the same as in the first embodiment described above.

[Sixth Embodiment]

Figure 11:
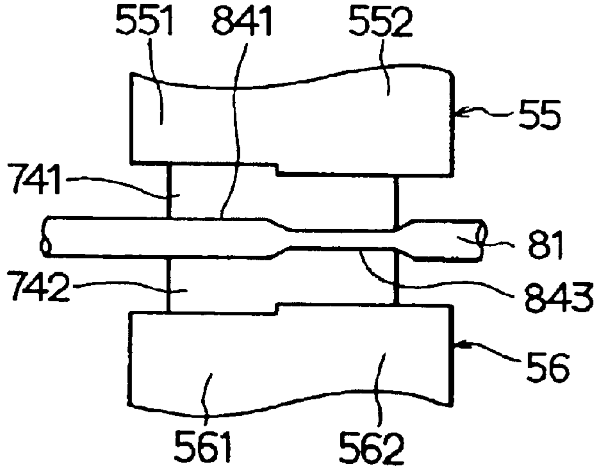
FIG. 11 is a front view schematically showing a resistance welding method of a sixth embodiment.

The FIG. 11 embodiment is arranged such that a step is provided in the gap between electrodes 55 and 56 to press and deform an upper piece 741 and a lower piece 742 having a uniform thickness.

That is, the electrodes 55 and 56 comprise wide gap sections 551 and 561 whose gap is wide and narrow gap sections 552 and 562 whose gap is narrow, respectively. The upper piece 741 and the lower piece 742 having uniform thickness as shown in FIG. 10 and the insulator coated wire 81 are disposed between the electrodes 55 and 56. Then, the upper piece 741 and the lower piece 742 are deformed as shown in FIG. 11 by feeding a current while pressing the conductive members 741 and 742 in this state.

The other elements are the same as in the first embodiment described above.

While preferred embodiments have been described, variations thereto will occur to those skilled in the art within the scope of the present inventive concepts which are delineated by the following claims.

What is claimed is:

1. A connecting terminal comprising:

an electrically conductive wire which is coated with an insulator coating film; and a conductive member which is formed as a single integral piece and which includes first and second clamping elements connected together by a connecting section, a first portion of the wire being clamped between the first clamping element and the second clamping element of the conductive member such that the first portion of the wire is electrically connected to the conductive member, a second portion of the wire extending from the conductive member, the second portion including the insulator coating film, and a width of the first portion of the wire tapering from a first point adjacent to the second portion to a second point distal from the second portion.

2. A connecting terminal according to claim 1, wherein said tapering is defined by a narrow cross-section and a wide cross-section, the wide cross-section being wider than the narrow cross-section and the wide cross-section being adjacent to the second portion of the wire and the narrow cross-section being distal from the second portion of the wire.

3. A connecting terminal according to claim 2, wherein the first portion of the wire extends diagonally across the first and second clamping elements of the conductive member.

4. A connecting terminal according to claim 2, wherein a thickness of at lest one of the first and second clamping elements at the narrow cross-section is greater than that of the first and second clamping elements at the wide cross-section.

5. A connecting terminal according to claim 1, wherein a first constant clamping pressure exists at the second point and a second constant clamping pressure exists at the first point, wherein the first constant clamping pressure is greater than the second constant clamping pressure.

6. A connecting terminal according to claim 1, wherein the wire is a single strand wire.

7. A connecting terminal according to claim 1, wherein the first portion of the wire is spaced from the connecting section of the conductor.

* * * * *